United States Patent [19]

Tsou

[11] 3,925,298

[45] Dec. 9, 1975

[54] METHOD OF MAKING DRY PIGMENTED POWDER PAINT

[75] Inventor: Ivan H. Tsou, Pontiac, Mich.

[73] Assignee: Grow Chemical Corporation, New York, N.Y.

[22] Filed: Apr. 25, 1973

[21] Appl. No.: 354,375

[52] U.S. Cl.............. 260/39; 260/37 R; 260/37 EP; 260/37 N; 260/40 R; 260/42.54
[51] Int. Cl.²....... C08J 3/08; C08J 3/12; C08J 3/20
[58] Field of Search............ 260/37 R, 37 EP, 37 N, 260/41 R, 94.9 F, 96, 40 R, 39, 42.54

[56] References Cited
UNITED STATES PATENTS

| | | | |
|---|---|---|---|
| 3,437,645 | 4/1969 | Paige et al...................... | 260/94.9 F |
| 3,561,003 | 2/1971 | Lanham et al..................... | 260/41 R |
| 3,684,783 | 8/1972 | Lauch............................. | 260/94.9 F |
| 3,691,143 | 9/1972 | Kadowaki et al............... | 260/94.9 F |
| 3,737,401 | 6/1973 | Tsou et al......................... | 260/34.2 |
| 3,751,402 | 8/1973 | Broering.......................... | 260/96 R |
| 3,772,262 | 11/1973 | Clementi......................... | 260/96 R |

FOREIGN PATENTS OR APPLICATIONS 920,543   3/1963   United Kingdom........... 260/94.9 F Primary Examiner—Allan Lieberman
Attorney, Agent, or Firm—Burton and Parker

[57] ABSTRACT

A method of making dry pigmented powder paint is disclosed wherein a liquid paint comprising a solvent portion which is immiscible with water, and a pigmented film forming portion, is finely divided into minute droplets, and contacted with steam superheated sufficiently to vaporize the solvent portion and cause the pigmented film forming portion to form dry paint particles, and where the spent superheated steam solvent vapor mixture is separated and condensed to recover the solvent portion.

9 Claims, 2 Drawing Figures

METHOD OF MAKING DRY PIGMENTED POWDER PAINT

BACKGROUND OF THE INVENTION

In a copending United States patent application, Ser. No. 186,695, filed on Oct. 5, 1971, now U.S. Pat. No. 3,737,401 a method of making powder paint is disclosed wherein a liquid paint is divided into minute droplets in the presence of a coagulating liquid causing the film forming portion of the liquid paint to precipitate as powder paint. This method results in an aqueous slurry containing powder paint, solvent, and coagulant. If dry powder paint is desired, for example, as used in the electrostatic spray or fluidized bed processes, the powder paint must be separated from the mixture and dried. It is also desirable to treat the resulting coagulant-liquid paint solvent solution to recover the liquid paint solvent portion for reuse. Both of the above separations and drying of the powder paint are expensive and time-consuming as they involve additional steps to complete. The drying step alone requires from 10 to 20 hours to complete, depending on the type of powder produced. It was thus desirable to develop a method which, while retaining the advantages of the advantages of the precipitation method over previous methods of making powder paint, would not require subsequent recovery and separation of the solvent for reuse, and a drying process to produce dry powder paint.

While the use of steam as a means of removing the solvent from a particulate polymer solution, resulting in a slurry of the polymer and water, and the use of steam to dry a solution of particulate matter, are known in the prior art, the use of steam to contact a liquid paint and cause the formation of a dry particulate powder paint, and the recovery of the solvent is not known in the prior art.

In the art of spray drying it is known that a solution of a resin in a solvent can be spray dried to produce particulate resin, but the removal of the solvent by the use of steam is not taught by that art, nor is the use of a water immiscible solvent in formulating the liquid paint to facilitate its removal and subsequent recovery for reuse in the process.

Examples of the above prior art techniques are shown in U.S. Pat. Nos.:

| | |
|---|---|
| 2,297,726 | 3,306,342 |
| 2,959,561 | 3,512,570 |
| 3,246,683 | 3,561,003 |

U.S. Pat. No. 3,306,342 teaches a method of precipitating polymeric materials from solutions containing them, brought about by contacting such solutions with a fluid medium capable of inducing precipitation of the materials. The fluid medium used to cause the precipitation may be steam, however, this method also results in a slurry comprising the polymer, its solvent and water. The method does not facilitate the separation and recovery of the solvent nor the production of dry particulate polymer.

U.S. Pat. No. 2,297,726 teaches a method and apparatus for drying or the like, which does not provide for the recovery of the solvent nor does it show the use of a water immiscible solvent to facilitate the removal of the solvent from the material.

SUMMARY OF THE INVENTION

In accordance with the present invention a dry pigmented powder paint is produced and substantially at the same time the paint solvent can be recovered and separated for reuse in the manufacture of the paint. A pigmented liquid paint is finely divided into minute droplets which are then contacted with steam superheated sufficiently to vaporize the solvent portion and cause the pigmented film forming portion to form dry paint particles, which are then cooled sufficiently to prevent their agglomeration. The spent superheated steam-solvent vapor mixture is separated from the powder at a sufficient rate to prevent condensation of either vapor on the powder particles, and the steam-solvent vapor mixture is condensed to form an immiscible liquid mixture of water and the paint solvent which are then separated for reuse of the solvent.

DESCRIPTION OF PREFERRED EMBODIMENT

Manufacture of a Pigmented Liquid Paint

The liquid paint used in this invention will comprise a film forming portion, a solvent portion, and will contain a pigment. The selection of this film forming portion and pigment will be determined by the particular application to be made of the powder paint, and the desired paint film, and is not critical to the invention. Such film formers as acrylics, alkyds, vinyls, polyesters, nylons, epoxy resins, hydrocarbon resins, ureas, melamines, and urethanes can be used in the method, and are prepared as usual in the normal manufacture of paint. The pigments must be finely enough pulverized to remain in homogeneous suspension throughout the liquid paint. The liquid paint used may be either thermoplastic or thermoset. When using thermosets care must be taken to insure the paint does not reach a condition that would cause premature cross-linking to occur.

In conventional liqiud paints the choice of a solvent is governed by the usage of the paint and the condition of that usage. Since powdered paint is essentially a solventless coating material, solvents may be selected during manufacture of the powder without regard to the application of the powder, nor the resulting paint film, and consequently the choice of a solvent can be tailored to the requirements of manufacturing powder having desirable physical characteristics. The properties the solvent must have for making powder paint by this method are that it is a good solvent for the film forming portion of the paint, and is immiscible with water. By selecting a good solvent for the film former less solvent can be used in manufacturing the paint, so the amount of film former in a given paint can be greater than if a poor solvent is used. If a liquid paint having a lower film forming content is desired, additional solvent can then be added. The solvent to film former concentration is important in controlling the powder paint particle size; the more dilute the film forming portion the smaller will be the particle size and as the film forming concentration increases the particle size will also increase.

The second requirement of the solvent, that it be immiscible with water, is necessary to facilitate the removal of the solvent from the liquid paint droplets and the separation and recovery of the solvent after its removal for reuse in the method.

When two immiscible fluids are mixed together, such as steam and xylene, the vapor pressure of the resulting fluid mixture will equal the sum of the total vapor pressures of each component. The vapor pressure of the mixture of immiscible liquids will be greater than either of its component's vapor pressures. If miscible fluids were used the vapor pressure of the resulting solution would equal the sum of the mole fractions of each component multiplied by its respective vapor pressure. The result would be a vapor pressure which would be intermediate between the vapor pressures of each component, but would not be greater than each component's vapor pressure.

Due to this property of immiscible liquids it will require less energy to volatilize two immiscible liquids than two miscible liquids, and this effect is relied on in this invention to facilitate the removal of the solvent from the liquid paint droplets by the action of the superheated steam.

In the text "*Elements of Physical Chemistry*", By Samual Glasstone and David Lewis, second edition (1960) at Pages 377–378 and following, the following is stated. "It is probably true that no two liquids are absolutely insoluble in each other, but with certain pairs, e.g., mercury and water and carbon disulfide and water, the mutual solubility is so small that the liquids may be regarded as virtually immiscible. For systems of this type, each liquid exerts its own vapor pressure, independent of the other, and the total vapor pressure is the sum of the separate vapor pressures of the two components in the pure state at the given temperature . . . A system of two immiscible liquids will boil, that is, distill freely, when the total vapor pressure is equal to the atmospheric pressure . . . The properties just described are utilized in the process of steam distillation, whereby a substance that is immiscible, or almost immiscible, with water, and that of a relatively high boiling point, can be distilled at a much lower temperature by passing steam through it . . . The mixture distills freely when the total pressure of the two components is equal to that of the atmosphere."

After the solvent has been removed from the liquid paint droplets by the superheated steam the resulting mixture of steam and solvent vapors are exhausted from the atomization chamber and condensed, resulting in the formation of water and the liquid paint solvent. By restricting the solvent to one which is immiscible with water the solvent is easily separated and recovered for reuse in the process. The solvents which are recommended for use are xylene, benzene and toluene but any aromatic solvent or oxygenated organic solvent which is immiscible in water could be used. The above listed solvents are common in the manufacture of conventional liquid paints.

Once the paint has been prepared, an optional step, which does alter the characteristics of the resulting powder, is to gradually and uniformly mix with the liquid paint a liqiud which is a non-solvent for the film forming portion, miscible with the solvent portion, and immiscible with water, in an amount less than that causing precipitation of the film forming portion. If it is desired to make the powder particles as small as possible, it is helpful to increase the concentration of the non-solvent liquid to just short of that necessary to effect precipitation of the film forming portion of the liquid paint.

Atomization of the Liquid Paint

After preparation of the liquid paint the next step is to atomize the paint into minute droplets.

One method of atomizing the liquid paint into minute droplets is to introduce the liquid paint into a jet of superheated steam as in FIG. 1. FIG. 1 illustrates the apparatus disclosed herein for the steam atomization of a liquid paint. A source of superheated steam is shown at 4, and a means at 6, an electrical heating tape, for further controlling the degree of superheat of the superheated steam just prior to its exit from the steam nozzle 8. The source of liquid paint is shown in FIG. 1 and the liquid paint is introduced into the steam jet via the paint line 12 which is provided with a solenoid controlled valve at 14 to regulate the rate of flow of the liquid paint. There will be a sufficient drop in pressure immediately adjacent to the steam nozzle to cause the liquid paint to be introduced into the jet of superheated steam. A means of positively introducing the liquid paint into the steam could be provided, such as a small pump or by introducing compressed air into the paint line. The rapid acceleration of the liquid paint caused by the jet of superheated steam will divide the liquid paint into minute droplets.

The liqud paint could also be introduced directly into the superheated steam nozzle prior to the exit from the steam nozzle as shown by phantom arrow 10. This would require the liquid paint to be under sufficient pressure to overcome the pressure of the superheated steam.

FIG. 2 illustrates the use of a conventional paint spray nozzle at 42 for atomizing the liquid paint into minute droplets of liquid paint 44 which are then contacted with a jet of superheated steam to further subdivide the liquid paint droplets. By varying the type of nozzle used and the amount of pressure, the size of the finely divided liquid paint droplets can be controlled.

Choice between the various methods of atomizing the liquid paint will depend to a large extent on the degree of heating the film forming polymer can withstand without deleteriously affecting its film forming characteristics. The internal mixing of the liquid paint and superheated steam within the steam nozzle as in FIG. 1 at 10, will cause the greatest increase in the temperature of the liquid paint while atomization of the liquid paint through a separate nozzle and then contacting it with the superheated steam as in FIG. 2 would result in the least temperature increase.

The size of the minute liquid paint droplets is important for two reasons, 1. it will affect subsequent removal of the solvent from the liquid paint droplets, and
2. it will also affect the resulting size of the powder paint particles.

The smaller the size of the liquid paint droplets the greater will be the surface area of a given amount of liquid paint. Since the liquid paint solvent is removed from the liquid paint droplets by evaporation, the larger the surface area the easier it will be to remove the solvent and form powder paint particles.

The size of the resulting powder paint particle will be proportional to the size of the droplets of liquid paint, because the size of the droplet will control the amount of liquid paint, and thus the amount of film former and pigment available to form a powder particle after the solvent is removed from the liquid paint droplet.

Removal of the Solvent Portion

The next step is to remove the paint solvent from the minute droplets of liquid paint to cause the film forming portion to form powder paint particles. This is accomplished according to this invention by contacting the minute droplets of liquid paint with superheated steam. By controlling the degree of superheat of the steam sufficient heat can be provided to cause the removal of the solvent and formation of dry powder paint particles.

Figure 1:
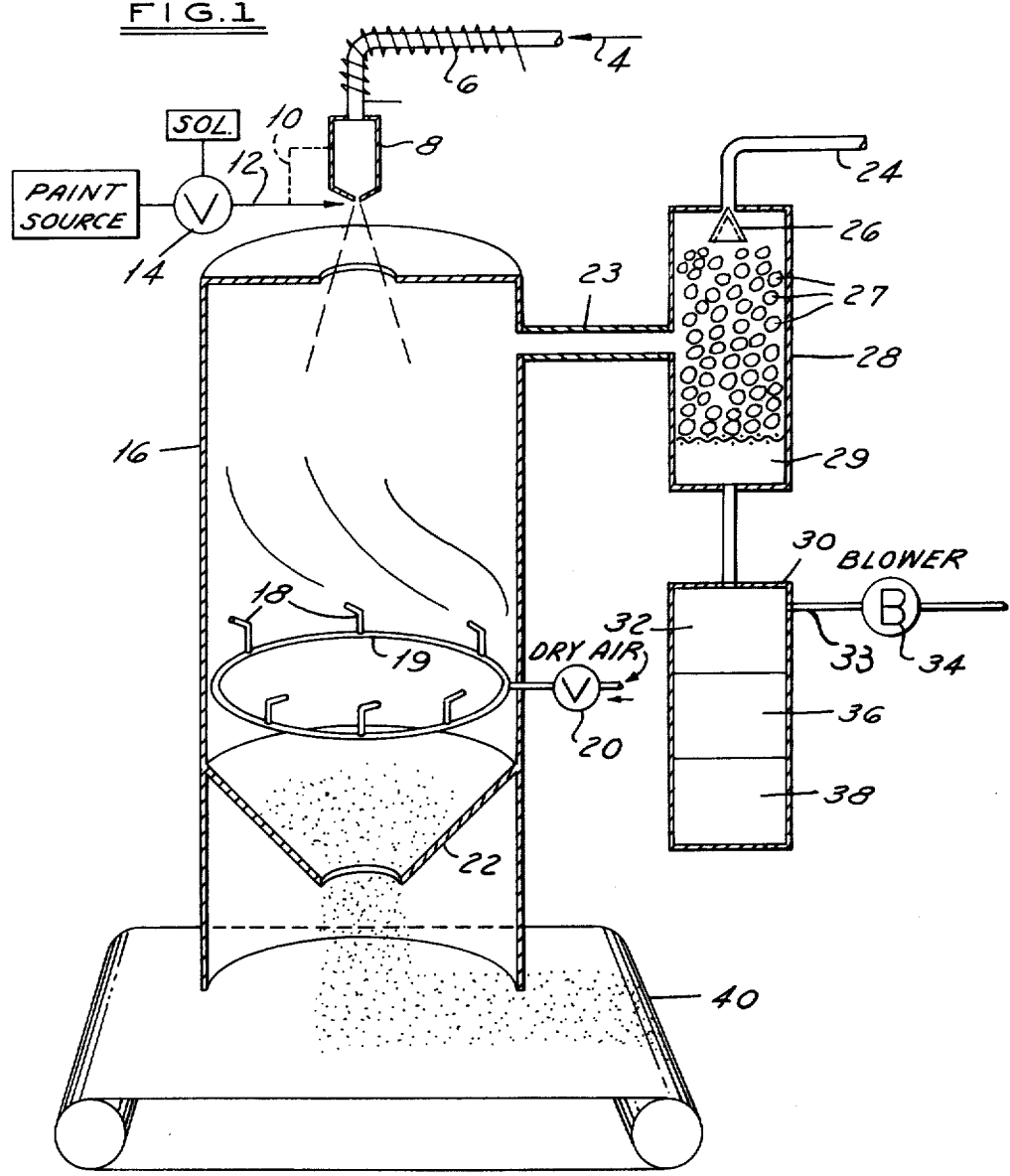
FIG. 1 is a schematic illustration of the apparatus dislcosed herein for the production of dry pigmented powder paint using superheated steam.

The preferred embodiment of this invention is to introduce the liquid paint into the superheated steam, (as shown in FIG. 1) thereby causing the formation of minute droplets of liquid paint. Immediately upon contacting the liquid paint with the superheated steam the paint will be broken up into minute droplets and subjected to rapid acceleration, both in the presence of the elevated temperature of the superheated steam. The rapid increase in surface area of the liquid paint caused by the formation of minute droplets together with the elevated temperature and rapid acceleration imparted by the superheated steam will result in the rapid evaporation and removal of the liquid paint solvent and particle formation by the film former and pigment.

The selection of superheated steam to evaporate the paint solvent from the liquid paint droplets affords great flexibility to the method as to the amount of superheat in the steam. The flexibility is important in that by controlling the degree of superheat of the steam the solvent can be completely removed from the liquid paint droplets and the powder paint particles. Also by controlling the degree of superheat of the steam the conditions in the atomization chamber can be maintained so as to prevent the condensation of the paint solvent after it has been evaporated from the droplets, and to prevent condensation of the spent superheated steam. A means of exhausting these spent vapors from the atomization chamber is also necessary to prevent their condensing, and is shown at 23.

The degree of superheat is also important in controlling the particle shape of the powder. The higher the degree of superheat the higher will be the temperature of the resulting liquid paint droplets and the more spherical will be the powder paint particles produced.

Figure 2:
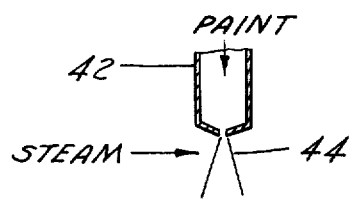
FIG. 2 is a schematic illustration of an embodiment of the invention in which the liquid paint is divided into minute droplets by a nozzle prior to being contacted with a jet of superheated steam.

When the liquid paint has been atomized separately as in FIG. 2, the droplets can then be contacted with a jet of superheated steam. By adjusting the pressure of the paint nozzle and the degree of superheat of the steam as well as the distances between the two nozzles the size of the liquid paint droplets and the removal of the solvent can be regulated to produce dry powder paint particles. It can also be said that one may control the degree of superheat of the steam in inverse relation to the desired powder paint size.

The atomization of the liquid paint and removal of the paint solvent will usually be carried out in a chamber such as 16 in FIG. 1 to provide for collection of the powder and recovery of the paint solvent. It is necessary that a means for sufficiently cooling the powder be provided. FIG. 1 shows a valve 20 for regulating the flow of cool dry air which enters an annular pipe 19 and is directed in a circular flow upwards and around the walls of the chamber by the nozzles 18 on the pipe. The current of dry cold air which is circulating around the walls of the chamber in a clockwise or counterclockwise direction prevents the powder from adhering to the walls of the collection chamber while the powder is still in a semi-liquid or sticky state by forming a circulating air current between the chamber walls and the powder, and by cooling the powder as it falls to the bottom of the chamber. The cooling must be sufficient to allow the powder to reach a temperature at which it is no longer in a liquid, semi-liquid or sticky state, so as to prevent agglomeration of the individual powder paint particles.

Exhausting the Spent Superheated Steam and Paint Solvent Vapor Mixture

A pipe 23 is provided to exhaust the spent superheated steam and paint solvent mixture from the point of atomization and evaporation to prevent either vapor from condensing and wetting the formed powder paint. When the atomization and solvent removal are carried out in a chamber as in FIG. 1, a blower 34 is used to exhaust the vapors out of the atomization chamber and into condensation chamber 28. The rate of removal of the spent vapor mixture will be closely related to the degree of superheat of the steam, and the type of paint solvent used. The lower the degree of superheat of the steam the faster the rate of removal of the vapors must be to prevent their condensation in the atomization chamber. Also the higher the volatilization temperature of the paint solvent, the higher the degree of superheat, and the faster the rate of removal of the vapors from the chamber, necessary to prevent their condensation.

Separating the Spent Superheated Steam and Paint Solvent Vapor Mixture

After removal of the spent superheated steam and paint solvent from the atomization chamber 16 into the condensation chamber, cold water 24 is finely sprayed 27 by the water spray nozzle 26 into the chamber to cause the steam and solvent vapors to condense and form a liquid mixture 29 of water and the paint solvent.

The liquid mixture of water and the paint solvent are drawn into the separatory chamber 30 where they will separate into two distinct layers of paint solvent 36 and water 38 because they are immiscible.

The blower 34 exhausts the air space 32 above the liquids in the separatory chamber via duct 33. The reduction in pressure caused in the air space in the separatory chamber by the blower controls the rate at which the spent superheated steam and solvent vapors are exhausted from the atomization chamber into the condensation chamber, and also their rate of removal from the condensation chamber into the separatory chamber.

A collection device for the powder is provided and may simply be a chamber in which the powder is allowed to accumulate, or as in FIG. 1 at 22, may consist of a chamber which allows the powder to accumulate on a conveyor belt 40 so as to provide for continuous removal of the powder from the atomization chamber.

Although the present invention has been described and discussed herein with reference to the drawings as illustrative of specific embodiments, it is understood that modifications and variations of the embodiments of this invention may be made without departing from

What is claimed is:

1. The method of making dry pigmented powder paint, comprising:

making a liquid paint having a pigmented film forming portion, and a solvent portion which is immiscible with water, finely dividing the liquid paint into minute droplets, contacting the minute droplets, contacting the minute droplets with steam superheated sufficiently to vaporize the solvent portion and cause the pigmented film forming portion to form dry paint particles, wherein the vapor pressure of solvent and steam totals at least atmospheric pressure, separating the spent superheated steam-solvent vapor mixture at a sufficient rate to prevent the condensation of either vapor on the powder paint particles, cooling the dry powder paint sufficiently to prevent agglomeration, condensing the steam-solvent vapor mixture to form an immiscible liquid mixture of water and the paint solvent, and separating the solvent for reuse in making the liquid paint.

2. The invention defined in claim 1 characterized by contacting the liqiud paint with steam superheated sufficiently to cause the atomization of the liquid paint into minute droplets and the removal of the solvent portion therefrom causing the pigmented film forming portion to form dry powder paint particles.

3. The invention defined in claim 2 characterized by controlling the degree of superheat of the steam in inverse relation to the desired powder paint particle size.

4. The invention defined in claim 2 characterized by controlling the proportion of the solvent portion to the film forming portion in the liquid paint in inverse relation to the desired powder paint particle size.

5. The invention defined in claim 2 characterized by diluting the liquid paint prior to atomization with a liquid which is miscible with the solvent portion but not a solvent for the pigmented film forming portion in an amount less than that causing coagulation of the film forming portion.

6. The invention defined in claim 2 characterized by contacting the liquid paint with steam superheated sufficiently to cause the pigmented film forming portion to form spherically shaped powder paint particles.

7. The invention defined in claim 2 characterized by providing a liquid paint haivng a thermosetting film forming portion.

8. the invention defined in claim 2 characterized by providing a liquid paint having a thermoplastic film forming portion.

9. The invention defined in claim 2 characterized by providing a liquid paint having a thermoplastic acrylic film forming portion, and xylene for its solvent portion.

* * * * *